Feb. 18, 1969   J. R. HALLER   3,428,602
PROCESS OF MAKING THICK POLYIMIDE STRUCTURES
Filed June 13, 1967
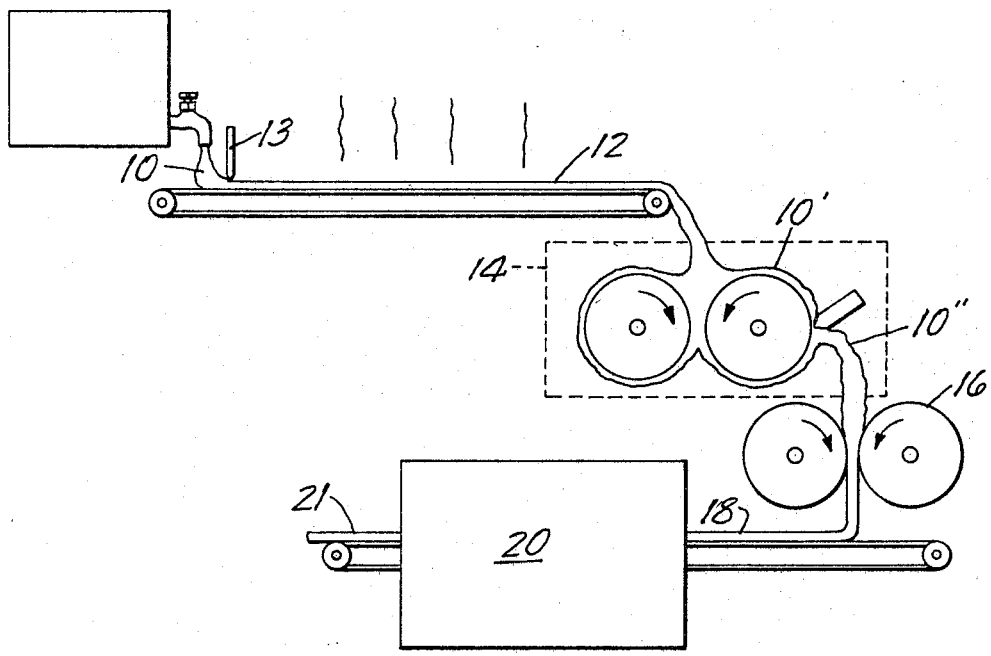
INVENTOR.
JAMES R. HALLER
BY
Carpenter, Kinney & Coulter
ATTORNEYS United States Patent Office 3,428,602
Patented Feb. 18, 1969

3,428,602
PROCESS OF MAKING THICK POLYIMIDE
STRUCTURES
James R. Haller, St. Paul, Minn., assignor to Minnesota
Mining and Manufacturing Company, St. Paul, Minn.,
a corporation of Delaware
Continuation-in-part of application Ser. No. 520,165,
Jan. 12, 1966. This application June 13, 1967, Ser.
No. 645,798
U.S. Cl. 260—47                                    8 Claims
Int. Cl. C08g 20/32, 53/00

ABSTRACT OF THE DISCLOSURE

Polyimide articles with relatively thick cross sections are prepared by subjecting a dilute solution of the polyamide acid precursor to a shearing action at an elevated temperature below the heat curing temperature to remove most of the solvent therein, then increasing the temperature to drive off the remaining solvent and convert the polyamide acid into the polyimide.

Cross reference to related application

This is a continuation-in-part of the copending application Ser. No. 520,165 filed Jan. 12, 1966, now abandoned.

Background of the invention

This invention relates to a process for making molded articles of isoluble and heat resistant polyimide material.

Essentially all articles that are made by casting or molding processes are formed from melt flowable plastics. The plastic material is placed in a mold and heated until it melts sufficiently to assume the form of the mold. Known heat resistant polyimide materials, however, are not melt flowable, and once the polyimide is formed, there is no known way that they can be rendered flowable for use as a casting or molding material. Yet such polyimide materials, being heat resistant and insoluble, are highly desirable for a vast range of articles.

The polyimide materials are produced from polyamide acid solutions that can exist in the flowable state. Thus, an alternative approach to the production of molded polyimide articles is to shape the article from the polyamide acid solution and then convert the premolded polyamide acid to the polyimide form. This approach has been successfully employed for the casting of very thin sections of the polyimide materials, e.g. up to about 10 mils thick. However, due to the presence of a high percentage of solvents in the polyamide acid solution, when thicker sections were formed, the heat curing applied in converting the polyamide acid to the polyimide caused a highly objectionable blowing and blistering of the material, rendering the end product commercially unusable.

The high percentage of solvents in the base polyamide acid solution is necessary for achieving a high molecular weight solution. Polyimides that are formed from low molecular weight polyamide acid solutions are brittle and cannot produce a useful molded article. Therefore, in order to produce suitable polyimide articles having thick sections, a high molecular weight polyamide acid solution must be first formed, and then a substantial amount of the solvent must be removed before the polyamide acid is shaped and converted into a polyimide.

For any polyamide acid compound (or chemical modification thereof), there is a low temperature range where some heat curing occurs, i.e. where the compound is converted to a polyimide. However, there is for each compound a higher temperature level where the heat curing becomes relatively very rapid. For the purpose of this invention, the small amount of heat curing that occurs within the lower temperature range is immaterial, and thereafter the above higher temperature level, whereat rapid curing is induced, will be referred to as the "heat curing temperature."

In removing the solvent from the polyamide acid solution, the temperature must be maintained below the above stated heat curing temperature. Otherwise, the conversion of the acid to the polyimide will occur either simultaneously or prior to the removal of the solvents, which removal then causes the objectionable blowing and blistering. Merely heat drying the polyamide acid solution below the heat curing temperature will drive off some of the solvents. However, it has been found that when the solvent content is reduced to about 50%, apparently because of the aggressive attraction between the solvent and the polyamide acid, merely continuing the heat drying process is ineffectual. Further solvent can be removed by raising the temperature to the boiling point of the solvent, but such temperature is above the heat curing temperature of the polyamide acid and the above mentioned problem of blowing and blistering is encountered.

Summary of the invention

The present invention relates to a process which successfully achieves a satisfactory concentration of a high molecular weight polyamide acid solution whereby the total solvents are removed at atmospheric pressure from the solution by vaporization, i.e. with such solvents being removed by heat drying at temperatures below the heat curing temperature.

In general, the preferred process of the invention includes first forming a high molecular weight polyamide acid solution, e.g. having a solvent content of more than about 75%. The solution is then cast into a thin film and heat dried at temperatures below the heat curing temperature of the polyamide acid. The concentrated polyamide acid solution, having about a 50% solvent content is then subjected to a shearing operation, e.g. in a rubber mill, while further heat drying at temperatures below the heat curing temperature. Surprisingly, such milling of the solution induces additional release of the solvent, and the resulting further concentrated substance can be heat cured without the objectionable blowing and blistering.

Detailed description

Thus the invention provides a flowable uncured polyamide acid solution which can be molded into objects having thick sections, i.e. greater than 10 mils, and then heat cured to form suitable polyimide articles. These articles of the invention are unitary void-free greater than 10 mils in thickness consisting essentially of a solution of not more than about 25 percent solvent and a polyamide acid having an inherent viscosity of from about 0.4 to 5.0.

The invention will now be more specifically described with the aid of the attached drawing, which schematically illustrates a preferred embodiment of the invention.

A polyamide acid solution 10 comprising about 15% solids and 85% solvents and having a heat curing temperature of about 93° C. is first formed into a thin wet film 12, as with a knife coater 13, and heat dried at a temperature of about 93° C. for about 15 minutes. The resulting substance 10' comprising about 50% solids and 50% solvents is placed in a rubber mill 14 and milled therein for a period of about one-half hour. During this time, the temperature of the mill rolls is gradually increased from about 65° C. up to about 149° C. The resulting viscous substance 10" is found to comprise a concentrated solution of about 75% polyamide acid to 25% solvents.

The substance 10″ is then removed from the mill and shaped as by passing it through nip rolls 16 to form it into a thick sheet 18, e.g. in excess of 20 mils thickness. The shaped material is then heated in a heat curing oven 20 within a temperature range from about 149° C. up to about 371° C. The polyamide acid is thus heat cured, driving off water to form the desired polyimide rings, while also driving off the residual solvent without any noticeable blowing or blistering of the end product 21.

Although the invention is in no way bound to the following theory, it is believed that the release of the additional percentage of solvents at temperatures below heat curing, is due to the shearing or frictional action of the mill. The shearing action of the mill rollers continuously exposes fresh portions of the polymeric substance. The solvent contained by said fresh portions is exposed to the heat produced in the mill and to the atmosphere, resulting in the release of an additional amount of the solvent to the atmosphere. The shearing action of the rubber mill rollers accomplishes a surface exposure that the cast films are unable to achieve, and it is this greater exposure which is believed to provide the additional drying of the acid solution prior to curing.

The invention is not limited to the specific process described above but rather relates more broadly to processes including the step of shearing the polyamide acid solutions and to unitary, void-free polyamide acid articles greater than 10 mils in thickness containing a minor amount of solvent. Specific examples of preferred forms of the invention, which are intended to illustrate and not to limit the invention, will now be set forth.

A 15% solution in dimethylacetamide of the polyamide acid of 4,4′-diaminodiphenyl ether and 3,4,3′,4′-benzophenone tetracarboxylic dianhydride was prepared, having a bulk viscosity of 20,000 centipoises at 25° C. 1800 grams of the solution were knife-coated onto a polytetrafluoroethylene carrier film so that a 0.018 inch thick, wet coating was formed. After heat drying for 15 minutes at 93° C., the cast film contained 55% solids and was sufficiently dry to be stripped from the polytetrafluoroethylene film. 500 grams of this material were placed on the moving rollers of a small rubber mill which had been preheated to 65° C. After several minutes of milling, the translucent material was concentrated to 60.4% solids. The mill rollers were then further heated to 82° C. and after several minutes, the material was concentrated to 61.4% solids. The material was then milled for a few minutes at 99° C. raising the concentration of the still translucent material to 68.2% solids. Further milling at 110° C. raised the solids content of the material to 74.3%.

The resulting material was much stiffer, thereby indicating the considerable loss of solvent. The hot polymeric material was then sheeted from the mill rollers and the greater portion was cured without dimensional restraint to 315° C. No. blistering occurred, and the cured sheet was found to be strong and flexible. The final thickness of the sheet was 0.12 inch. The remaining material sheeted from the 110° C. mill rollers was passed through nip rolls heated to the same temperature (110° C.) and was reduced in thickness to 0.041 inch.

In a similar way, a dilute solution of a polyamide acid of 4,4′-diaminodiphenyl ether and pyromellitic dianhydride having an inherent viscosity between 0.4 and 5.0 was prepared and concentrated to greater than 75 percent solids. Unitary, void-free articles greater than 10 mils in thickness are conveniently prepared from such concentrated material.

In other examples, and in general applying the above process, numerous articles have sections with thicknesses up to 200 mils and greater have been molded. In each instance, the article was found to be strong and flexible, while including the various other characteristics making it highly attractive for commercial applications.

Although the above cited examples are concerned with the concentration of a polyamide acid solution in a rubber mill machine and the subsequent heat curing thereof, the same advantages can be realized by milling or shearing a chemical modification of the polyamide acid solution. For instance, the dilute polyamide acid solution may be modified or cyclized to form a dilute solution of polyiminolactone, polyamide ester, polyamide amide and the like. The modified solution can then be concentrated by heat drying and milling and then heat cured to form the polyimides in the same manner as described for the polyamide acid solution.

It is understood that the base dilute high molecular weight polyamide acid solution may include other ingredients such as pigments, fillers, plasticizers and the like for achieving special end products, without departing from the scope of the invention.

Polyamide acid solutions useful in the practice of the invention are known to the art. These include solutions of a diamine having a divalent group containing at least two carbon atoms with a tetracarboxylic acid dianhydride containing a tetravalent group containing at least 2 carbon atoms, with no more than 2 carbonyl groups of the dianhydride radical being attached to any one carbon atom of the tetravalent group. Reference is made to United States Patents 3,179,614, 3,179,632 and 3,179,634 and South African Patent No. 60/1,040 with respect to these.

Preferably, the tetracarboxylic acid dianhydride radicals contain a tetravalent group containing at least 6 carbon atoms and having benzenoid unsaturation, each of the 4 carbonyl groups of the dianhydride radical being attached to a separate carbon atom in the tetravalent group, the carbonyl groups being in pairs in which the groups in each pair are attached to adjacent carbon atoms of the tetravalent group. Another useful class of dianhydride are those containing heterocyclic rings. Illustrative of dianhydrides suitable for use in the present invention are:

Pyromellitic dianhydride; 2,3,6,7-naphthalene tetracarboxylic dianhydride; 3,3′,4,4′-diphenyltetracarboxylic dianhydride; 1,2,5,6 - naphthalene tetracarboxylic dianhydride; 2,2′,3,3′-diphenyl tetracarboxylic dianhydride; 2,2-bis(3,4-dicarboxyphenyl) propane dianhydride; bis(3,4-dicarboxyphenyl)sulfone dianhydride; perylene 3,4,9,10-tetracarboxylic acid dianhydride; 3,3′,4,4′-tetracarboxy benzophenone dianhydride.

The organic diamines useful in preparing the polyimides have the structural formula $H_2N$—$R'$—$NH_2$, wherein $R'$ is a divalent radical containing at least 2 carbon atoms, may be aromatic, heterocyclic, aliphatic, cycloaliphatic, or a combination thereof. These groups can be substituted with halo, $R''$—, $R''O$—, $R''S$— and the like groups, wherein $R''$ is hydrocarbon containing up to six carbon atoms. The most useful diamines are the primary diamines and the preferred $R'$ groups in the diamines contain benzenoid unsaturation. Among the diamines which are suitable for use in the present invention are: 4,4′-diaminodiphenyl ether; 5-amino-2-(p-aminophenyl) benzthiazole; 4-amino-2-(p-aminophenyl)benzthiazole; 5-amino - 2 - (m-aminophenyl)benzthiazole; 4-amino-2-(m-aminophenyl)benzthiazole; 5 - amino - 2- (p-aminophenyl)benzoxazole; 4 - amino-2-(p-aminophenyl)benzoxazole; 5 - amino - 2 - (m-aminophenyl)benzoxazole; 4-amino- - 2 - (m-aminophenyl)benzoxazole; 2,5-diamino benzoxazole; 2,5-diamino benzthiazole; etc.

The preferred solutions generally include polyamide acid solutions having viscosities that range from about 500 centipoises (cp.) to several million cp. at polymer concentrations ranging from about 8% by weight to about 20% by weight. a Brookfield viscometer (model LVT) has been used to determine the viscosities of solutions used in the process of this invention.

The suitability of the polyamide acid solutions are, however, determined on the basis of molecular weight. Inherent viscosity is a convenient indication of the molecular weight of the polyamide acid polymer and is determined as follows:

$$\text{Inherent viscosity} = \frac{\text{natural logarithm of}\left(\frac{\text{viscosity of solution}}{\text{viscosity of solvent}}\right)}{C}$$

where C is the concentration of the solution expressed in grams of polyamide acid per 100 milliliters of solution. Measurements are made at 25° C. of a solution containing 0.5% by weight of polyamide acid in dimethylacetamide solution.

Depending on the specific compounds employed, polyamide acids having inherent viscosities ranging from about 0.4 to about 5.0 will produce suitable thick sections of the polyimide materials in accordance with the disclosed invention. However, the preferred range is from about 1.0 to about 3.5.

What is claimed is:

1. A process for forming polyimide articles which comprises subjecting a solution of a polyamide acid containing about 50 percent solids to a shearing action while heat drying it at a temperature below the heat curing temperature to form an uncured, concentrated polyamide acid containing at least about 75 percent solids, shaping the concentrated polyamide acid into an article and subjecting the article to a higher temperature to drive off the remaining solvent and convert the polyamide acid into the polyimide.

2. A process according to claim 1 wherein the polyamide acid is a reaction product of 4,4'-diaminodiphenyl ether and 3,4,3',4'-benzophenone tetracarboxylic dianhydride.

3. A process according to claim 1 wherein the polyamide acid is a reaction product of 4,4'-diaminodiphenyl ether and pyromellitic dianhydride.

4. A process for forming polyimide articles which comprises heat drying a dilute solution of a high molecular weight polyamide acid until a portion of the solvent therein has been removed and the solution rendered highly viscous, subjecting the resulting viscous material simultaneously to a shearing action and to heat drying at a temperature below the heat curing temperature to further concentrate it to at least about 75% solids, forming the resulting concentrated material into the desired shape and subjecting the article to a higher temperature to drive off the remaining solvent and convert the polyamide acid into the corresponding polyimide.

5. A process for forming thick sections of a polyimide material which comprises forming a dilute solution of a polyamide acid and a solvent, heat drying the solution at about 90–120° C. until it is concentrated to about 50% solids, milling the resulting material in a rubber mill at an increasing temperature within the range of about 65°–150° C. until it is further concentrated to about 75% solids forming the concentrated material into the desired shape and heat curing at a temperature in excess of 150° C. to drive off the remaining solvent and convert the polyamide acid into the corresponding polyimide.

6. A process for forming a highly viscous concentrated polyamide acid capable of being heat cured into a polyimide article of thick cross section comprising subjecting a solution of the polyamide acid containing about 50 percent solids to a shearing action while heat drying it at a temperature below its heat cure temperature to form a concentrated polyamide acid containing at least about 75 percent solids.

7. A process according to claim 6 wherein the polyamide acid is a reaction product of 4,4'-diaminodiphenyl ether and 3,4,3',4'-benzophenone tetracarboxylic dianhydride.

8. A process according to claim 6 wherein the polyamide acid is a reaction product of 4,4'-diaminodiphenyl ether and pyromellitic dianhydride.

References Cited

UNITED STATES PATENTS

| 3,179,614 | 4/1965 | Edwards | 260—30.2 |
| 3,179,630 | 4/1965 | Endrey | 260—78 |

WILLIAM H. SHORT, *Primary Examiner.*

L. L. LEE, *Assistant Examiner.*

U.S. Cl. X.R.

260—65, 78; 264—331